United States Patent Office 3,396,175
Patented Aug. 6, 1968

3,396,175
EPISULPHIDE PRODUCTION
Friedrich K. Lautenschlaeger, Toronto, Ontario, and Norman V. Schwartz, Oakville, Manitoba, Canada, assignors to The Dunlop Company Limited, London, England, a British company
No Drawing. Filed July 28, 1966, Ser. No. 568,410
Claims priority, application Great Britain, Aug. 10, 1965, 34,104/65
15 Claims. (Cl. 260—327)

ABSTRACT OF THE DISCLOSURE

Preparation of monomeric vicinal episulphides by reducing a chloropolysulphide, being the reaction product of a hydrocarbon olefin with a sulphur chloride compound having a mol ratio of sulphur to chlorine of at least 0.5:1 using as the catalyst a sulphide of a metal of the A sub-group of Group I of the Mendeléeff Periodic Table in an amount such that the mol ratio of the metal sulphide:chloropolysulphide is from 1:1 to 6:1, said metal sulphide being in the dry powdered, flake or granular form. These episulphides may be polymerized or copolymerized to form polymers useful, for example, in adhesive compositions.

This invention relates to a process for the preparation of monomeric sulphur-containing compounds and to monomeric compounds prepared by the process, and is an improvement in or modification of the invention described and claimed in our copending patent application Ser. No. 435,739 filed February 26, 1965.

In our copending patent application Ser. No. 435,739 there is described and claimed a process for the preparation of a monomeric compound containing the group

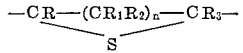

wherein each R group represents a hydrogen atom, an alkyl group, a cycloalkyl group or an aralkyl group, and $n$ is an integer (including zero), which comprises reducing a chloropolysulphide, being the reaction product of a hydrocarbon olefine with a sulphur chloride compound having a mole ratio of sulphur to chlorine of at least 0.5:1, using a non-acidic reducing system.

According to the present invention, a process for the preparation of a monomeric compound containing the group

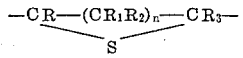

wherein each R group represents a hydrogen atom, an alkyl group, a cycloalkyl group or an aralkyl group, and $n$ is an integer (including zero), comprises contacting a chloropolysulphide, being the reaction product of a hydrocarbon olefine and a sulphur chloride compound having a mole ratio of sulphur:chlorine of at least 0.5:1, with, as reducing agent, a sulphide of a metal of the A sub-group of Group I of the Mendeléeff Periodic Table in an amount such that the mole ratio of the metal sulphide:chloropolysulphide is from 1:1 to 6:1.

According to the present invention also, there is provided a monomeric compound when prepared by the process according to the immediately preceding paragraph.

Examples of monomeric compounds which may be prepared by the method of the present invention are the episulphides ($n$ equals zero in the specified formula) of mono-olefines such as ethylene, propylene, butene, pentene, 4-methyl-1-pentene, 4-methyl-2-pentene, hexene, octene-1 and octene-2; the episulphides of cycloaliphatic mono-olefines such as cyclobutene, cyclopentene, cyclohexene and cyclo-octene; the monoepisulphides and diepisulphides of acyclic aliphatic diolefines such as butadiene, pentadiene, hexadiene and octadiene; the episulphides of cyclic diolefines such as cyclopentadiene, cyclohexadiene and cyclo-octadiene, and the episulphides of aromatic olefines such as styrene. An example of a monomeric compound of the above formula where $n$ is greater than 1 is a chlorothiol of bicyclic thianonane.

The chloropolysulphide which is reduced to form the monomeric compound is obtained by reacting a hydrocarbon olefine with a sulphur chloride compound having a mole ratio of sulphur:chlorine of at least 0.5:1. It is to be understood that the sulphur in the sulphur chloride compound need not necessarily all be combined with the chlorine. For instance, a mixture of two moles of free sulphur and one mole of sulphur dichloride is regarded for the purposes of this specification as a sulphur chloride compound having a mole ratio of sulphur:chlorine of 4:2, i.e. 2:1. However, the chlorine in the sulphur chloride compound must be combined with at least some of the sulphur since free chlorine is undesirable.

Preferably, the sulphur chloride compound has a sulphur:chlorine mole ratio of 1:1. Sulphur chloride compounds having a sulphur:chlorine mole ratio greater than 1:1 can be used and such compounds may increase the yield of the chloropolysulphide produced but they have the disadvantage that sulphur tends to crystallise out and hinder distillation of the product. A sulphur chloride compound having a mole ratio of sulphur-chlorine of greater than 1:1 can be obtained by reacting sulphur monochloride with sulphur, for instance by refluxing a mixture of the two reagents for several days and then removing excess sulphur monochloride. The product is a mixture of sulphur chlorides some of which may have a mole ratio of sulphur:chlorine as high as 25:1. Using such a mixture the yield of the chloropolysulphide obtained can be as high as 100 percent.

If a sulphur chloride compound having a mole ratio of sulphur-chlorine of 0.5:1 is employed, the product comprises a major proportion of the chloromonosulphide. If a sulphur chloride compound having a mole ratio of sulphur:chlorine of 1:1 is employed, the product is a mixture of the chloromonosulphide, the chlorodisulphide and the chlorotrisulphide, the whole of which can be distilled, i.e. there are negligible distillation residues. If a sulphur chloride compound having a mole ratio of sulphur:chlorine of greater than 1:1 is employed, the product is a mixture of the chloromonosulphide and chloropolysulphides which cannot be completely distilled. The reaction conditions should be such that the product comprises a minimum proportion of the chloromonosulphide and a maximum proportion of the chlorodisulphide.

The amount of the sulphur chloride compound used is usually such that the mole ratio of the sulphur chloride compound when based on the average molecular weight (i.e. the weight of the compound which would completely react with 2 moles of a mono-olefine so that all the available chloride had been reacted), to the hydrocarbon olefine is from 1:1 to 1:5, preferably from 1:2 to 1:3.5.

However, the amount of the sulphur chloride compound used when a diolefine is used is dependent to some extent upon whether it is desired to form a compound having a single group of the specified formula, or a compound having more than one such group. When it is desired to produce a compound having more than one of the specified groups, then the amount of the sulphur chloride compound used will usually be such that the mole ratio of the sulphur chloride compound when based on the average molecular weight to the hydrocarbon diolefine is preferably from 1:1 to 1:2.

The amount of the reaction between the hydrocarbon olefine and the sulphur chloride compound is a mixture of a chloromonosulphide and a chloropolysulphide. It is the chloropolysulphide (usually a disulphide) which is reduced to produce a compound containing a group of the specified formula; the chloromonosulphide is not reduced.

The chloropolysulphide which is produced by reacting the sulphur chloride compound with the hydrocarbon olefine can be a monomeric dichloropolysulphide or a polymeric form of the dichloropolysulphide, depending upon the olefine used as starting material and the amount of the sulphur chloride compound used. When the olefine is a mono-olefine the product will be a monomeric dichloropolysulphide, but when a polyolefine, whether cyclic or acyclic, is used the product may be a monomeric chloropolysulphide or a polymeric form of the chloropolysulphide, depending to some extent upon the amount of the sulphur chloride compound used. The monomeric chloropolysulphide is reduced to form a monomeric compound containing a single group of the specified formula whether the original hydrocarbon olefine was a mono-olefine or a polyolefine. The polymeric form of the chloropolysulphide is reduced to yield a compound containing two or more of the specified groups which may be, for example, a di-episulphide or an episulphide (i.e., $n$ equals zero in the specified formula) having more than two episulphide rings, depending upon the number of double bonds in the original olefine, or it may be a compound of the specified formula wherein $n$ is at least 1. When the original olefine is a polyolefine, it is probable that the final product will be a mixture of the compound having one of the specified groups and the compound having more than one of the specified groups, the predominant product being determined by the amount of the sulphur chloride compound used and the reaction conditions.

If desired, the sulphur chloride compound can be added to the olefine in small proportions, or vice-versa. The chloropolysulphide can be prepared from a liquid olefine or a gaseous olefine and in the case where a gaseous olefine is used the olefine can be used in the form of a solution in a suitable solvent therefor such as carbon tetrachloride.

Alternatively, when a gaseous olefine is used the olefine can be added to the sulphur chloride compound or to a solution of the sulphur chloride compound in, for instance, carbon tetrachloride, or the gaseous olefine can be formed into its liquid form prior to addition of the sulphur chloride compound and the reaction carried out in a sealed reaction vessel in the absence of a solvent for the olefine.

The reaction between the sulphur chloride compound and the hydrocarbon olefine may be carried out in the presence of a catalyst which is cationic in character. Examples of catalyst which may be used are zinc chloride, aluminium trichloride, ferric chloride, boron trifluoride which is normally used in the form of an etherate, and phosphours pentachloride but preferably the catalyst is a tertiary organic base such as pyridine. If a catalyst is used the reaction is normally carried out at the lowest temperature at which it proceeds readily, for example at temperatures between —50° C. and 20° C., preferably between —10° C. and 20° C. Alternatively, the reaction can be carried out in the absence of a catalyst and in this case the temperature employed may be as high as 100° C. However, when a gaseous olefine is used, temperatures of less than 100° C., e.g., 30° C. to 70° C. are used. The reaction can conveniently be carried out at the boiling point of the olefine, if this is a liquid at ordinary temperature.

If desired, free sulphur or ethyl tetrasulphide may be added to the reaction mixture to regenerate sulphur monochloride from the sulphur dichloride formed. The amount of free sulphur or ethyl tetrasulphide added is not critical, and a large excess may be used if desired.

Preferably, the reaction between the hydrocarbon olefine and the sulphur chloride compound is effected in the absence of solvent but, if desired, the reaction can be carried out in an inert solvent such as a hydrocarbon, a chloro-substituted hydrocarbon or an ether. Examples of solvents which can be used are hexane, diethyl ether, carbon tetrachloride, and especially polar solvents such as acetonitrile and nitrobenzene. The amount of solvent used can vary considerably and is usually between 5 mls. and 50 mls. of solvent per mole of the olefine, preferably between 10 mls. and 25 mls. of solvent per mole of the olefine. However, amounts in excess of 50 mls. per mole can be used if desired.

Typical chloropolysulphides which can be reduced to form the monomeric episulphides can be prepared by the process described in our copending patent application Ser. No. 436,309, filed Mar. 1, 1965. In copending application Ser. No. 436,309 there is described and claimed a process for the prepartion of a dichloropolysulphide which comprises reacting a hydrocarbon olefine with a sulphurchloride compound having a mole ratio of sulphur:chlorine of greater than 1:1. The chloropolysulphide so prepared can be reduced by the process according to the present invention to form a monomeric episulphide. Examples of chloropolysulphides which may be reduced by the process of this invention are bis(2-chloroethyl)polypolysulphides, bis(beta-chloropropyl)polysulphides, bis(beta-chlorocyclohexyl)polysulphides, and the adducts of a sulphur chloride compound with cis-but-2-ene, trans-but-2-ene, cyclopentene, isobutene, 1,3-butadiene, 1,4-pentadiene, 1,5-hexadiene, 1,7-octadiene or styrene.

The reduction of the chloropolysulphide to the episulphide is effected by mixing the chloropolysulphide with a sulphide of a metal of Group IA of the Mendeléeff Periodic Table in an amount such that the mole ratio of the metal sulphide:chloropolysulphide is from 1:1 to 6:1. It is not necessary to isolate the chloropolysulphide from the reaction products prior to reducing it. The metal sulphides which may be used include the monosulphides and polysulphides, and examples of suitable compounds are sodium sulphide and potassium sulphide. When sodium sulphide is used, it should contain some water of hydration although if too much water is present the yield of episulphide is reduced.

Preferably, the metal sulphide is employed in the powdered, flake or granular form and preferably the reduction is effected in the absence of a solvent for the chloropolysulphide although a solvent for the chloropolysulphide may be used if desired. The reduction of the chloropolysulphide is preferably carried out by maintaining a gradual addition of the chloropolysulphide to a Group IA metal sulphide whilst the mixture is stirred.

The reduction of the chloropolysulphide results in liberation of free sulphur which tends to hinder the reduction process and consequently results in lower yields of the monomeric compounds. It is therefore preferred to remove the free sulphur as it is liberated and this can be done by employing excess metal sulphide which absorbs the sulphur to form a Group IA metal polysulphide. Alternatively, a different sulphur-accepting compound such as a sulphite or phosphite of a metal of Group IA of the Mendeléeff Periodic Table, or triphenyl phosphine, can be employed.

The amount of the Group IA metal sulphide used is not critical but it will be such that the mole ratio of the metal sulphide:chloropolysulphide is from 1:1 to 6:1, and preferably from 3:1 to 5:1. However, when a sulphur-accepting compound to remove free sulphur from the reaction mixture is employed in addition to the metal sulphide, smaller amounts of the metal sulphide may be used.

The amount of the additional sulphur-accepting compound may vary over a wide range but will usually be such that the mole ratio of this compound to the metal sulphide is from 1:1 to 6:1, preferably from 3:1 to 5:1. When such a compound is used, it is preferably used in the powdered, flake or granular form and is preferably thoroughly mixed with the metal sulphide.

The monomeric compounds of the present invention (especially those in which $n$ equals zero) can be polymerized to yield useful polymers.

The invention is illustrated by the following examples, in which each chloropolysulphide employed was prepared by reacting the corresponding hydrocarbon olefine with a sulphur chloride compound as hereinbefore described.

EXAMPLE I

This example illustrates the preparation of propylene sulphide by the reduction of a bis(beta-chloropropyl) disulphide, using sodium sulphide as the reducing agent.

A mixture of 50 gms. (0.21 mole) of sodium sulphide, having 9 moles of water of crystallization, and 25 gms. (0.2 mole) of sodium sulphite were added to a 300 ml. flask fitted with a stainless steel stirrer, dropping funnel and condenser. The pressure was reduced to about 10 mms. of mercury and the flask was heated in an oil-bath while the contents of the flask were stirred. When the temperature of the mixture reached 160° C., 10 gms. (0.045 mole) of bis(beta-chloropropyl) disulphide were added through the dropping funnel. The temperature of the reaction mixture was maintained between 100° C. and 120° C. for 2 hours after which time about 25 mls. of water and an oil were collected in an ice-cooled receiver attached to the condenser. The oil was separated and was identified by infrared spectroscopy techniques and vapour-phase chromatography to be bis(beta-chloropropyl)disulphide containing about 15 per cent by weight of the disulphide. This oil was distilled and 4.5 gms. of propylene sulphide were recovered (77 percent yield based on the unrecovered starting material). The propylene sulphide so obtained was dried over magnesium sulphate and redistilled. The infrared spectrum and vapour-phase chromatogram of the distilled product showed that the propylene sulphide was more than 99 percent pure.

The above procedure was repeated six times, but using the disulphide, sodium sulphide and sodium sulphite in the amounts shown in Table I below. The yields are shown in Table II below:

TABLE I

| | Disulphide (gms.) | Na₂S (gms.) | Na₂SO₃ (gms.) | Ratio * |
|---|---|---|---|---|
| Expt No.: | | | | |
| 1 | 10 | 50 | 25 | 1:4:4 |
| 2 | 10 | 50 | 25 | 1:4:4 |
| 3 | 10 | 35 | 25 | 1:4:4 |
| 4 | 5 | 12.5 | 12.5 | 1:4:4 |
| 5 | 5 | 12.5 | 0 | 1:4 |
| 6 | 5 | 6 | 0 | 1:2 |
| 7 | 5 | 6 | 6 | 1:2:2 |

* Ratio represents the molar ratio of the disulphide-Na₂S:Na₂SO₃.

In experiments 1, 2 and 3, the sodium sulphide used contained 9 moles of water of crystallization, and in experiments 4 to 7 the sodium sulphide used was in flake form.

TABLE II

| | Temp. (° C.) | Yield |
|---|---|---|
| Expt. No.: | | |
| 1 | 100–120 | 4 gms. (59%) episulphide. |
| 2 | 100–120 | 4.5 gms. (66%) episulphide. |
| 3 | 80–100 | 5.5 gms. (81%) episulphide. |
| 4 | 80–100 | 3.0 gms. (88%) episulphide. |
| 5 | 80–100 | 2.8 gms. (82%) episulphide. |
| 7 | 25–100 | 2.2 gms. (65%) episulphide. |

EXAMPLE II

This example illustrates the reduction of bis(beta-chlorocyclohexyl)polysulphide using sodium sulphide as the reducing agent.

The bis(beta-chlorocyclohexyl)polysulphide used in this reaction contained 13 percent irreducible monosulphide compound. A mixture of 17 gms. of the polysulphide, 25 gms. of sodium sulphide and 14 gms. of sodium sulphite were placed in a round-bottomed flask which was connected to a rotary evaporator. The flask was evaporated to a pressure of 3 to 4 mms. of mercury and was then heated in an oil-bath to 80° C. for four hours as it rotated. After this time 6.5 gms. of a water-insoluble liquid were collected in a Dry-Ice trap. The organic liquid was separated from the water which carried over and was dried over magnesium sulphate. An analysis of this material by vapour-phase chromatography and infra-red spectroscopy showed it to consist of 73 percent of cyclo hexene episulphide and 27 percent of cyclohexene, corresponding to a yield of episulphide of 41 percent of the calculated theoretical yield.

EXAMPLE III

This example illustrates the preparation of ethylene sulphide prepared by reducing bis(2-chloroethyl)disulphide using sodium sulphide.

120 gms. of coarsely powdered sodium sulphide (60% technical grade) were added to a 1 litre 3-necked flask fitted with a mechanical stirrer. The flask and contents were heated to 80° C. and the system was evacuated to 80 torr. and then 34 gms. of bis(2-chloroethyl)disulphide were slowly dripped onto the stirred sodium sulphide. When the addition was complete, the reaction mixture was heated for a further 30 minutes before the product, which was continuously being distilled during the reaction, was collected in a Dry-Ice trap. The product was mixed with water that had been distilled from the sodium sulphide. The ethylene sulphide so obtained, weighed 16 gms. (75 percent yield) and, after drying over magnesium sulphate, had a refractive index $N_D^{20}$ of 1.4945.

This product was shown to be more than 99 percent pure by vapour-phase chromatography and its infrared spectrum was identical with that expected of ethylene sulphide. The major infrared absorbances measured in cm.$^{-1}$ were: 3060, 2985, 2875, 2840, 2090, 2060, 1940, 1845, 1709, 1440, 1420, 1212, 1106, 1040, 1018, 938, 818, 650 and 600.

EXAMPLE IV

This example illustrates the preparation of trans-2,3-dimethyl thiirane.

The procedure of Example III was followed for the reduction of 42 gms. of a trans-but-2-ene/sulphur monochloride adduct using 120 gms. of sodium sulphide at a temperature between 95° C. and 110° C. and at a pressure of 80 torrs. The trans-2,3-dimethyl thiirane product, collected as in Example III, weighed 18.6 gms. (62 percent yield) and, after drying over magnesium sulphate, had a refractive index $N_D^{20}$ of 1.4640.

The product gave the following infrared absorbances (cm.$^{-1}$): 2990, 2950, 2905, 2885, 2855, 2810, 2735, 1474, 1452, 1443, 1428, 1372, 1360, 1330, 1250, 1200, 1139, 1060, 1020, 980, 948, 799, 575.

EXAMPLE V

This example illustrates the preparation of cis-2,3-dimethyl thiirane.

The procedure of Example III was followed for the reduction of 42 gms. of a cis-but-2-ene/sulphur monochloride adduct using 120 gms. of sodium sulphide at a temperature of between 95° C. and 110° C. and at a pressure of 80 torrs. The cis-2,3-dimethyl thiirane product, collected as in Example III, weighed 19.1 gms. (64 percent yield) and, after drying over magnesium sulphate, had a refractive index $N_D^{20}$ of 1.4775.

The product gave the following infrared absorbances (cm.$^{-1}$): 2985, 2970, 2945, 2910, 2890, 2855, 2722, 1450, 1434, 1389, 1368, 1288, 1189, 1158, 1146, 1080, 1060, 1048, 932, 970, 943, 828, 575.

EXAMPLE VI

This example illustrates the preparation of cyclo pentene episulphide.

45 gms. of a cyclopentene/sulphur monochloride adduct were reduced by the procedure of Example III using 110 gms. of sodium sulphide at a temperature of 80° C. and at a pressure of 20 torrs. The cyclopentene episulphide product, collected as in Example III, weighed 15.6 gms. (47 percent yield) and, after drying over magnesium sulphate, had a refractive index $N_D^{20}$ of 1.5230.

The product gave the following infrared absorbances (cm.$^{-1}$): 3045, 2980, 2950, 2915, 2900, 2875, 2855, 2755, 2722, 1456, 1443, 1435, 1367, 1295, 1152, 1072, 1045, 1007, 805, 610, 554.

EXAMPLE VII

This example illustrates the preparation of 2,2-dimethyl thiirane.

40 gms. of an isobutene/sulphur monochloride adduct were reduced by the procedure of Example III using 120 gms. of sodium sulphide at a temperature of 100° C. and at a pressure of 80 torrs. The 2,2-dimethyl thiirane product, collected as in Example III, weighed 12.9 gms. (44 percent yield) and, after drying over magnesium sulphate, had a refractive index $N_D^{20}$ of 1.4660.

The product gave the following infrared absorbances (cm.$^{-1}$): 3020, 2940, 2890, 2840, 1455, 1428, 1331, 1311, 1285, 1257, 1213, 1130, 1105, 1033, 1000, 962, 910, 880, 854, 813, 721, 608, 568.

EXAMPLE VIII

This example illustrates the preparation of vinyl thiirane.

40 gms. of a 1,3 - butadiene/sulphur monochloride adduct were reduced by the procedure of Example III using 120 gms. of sodium sulphide at a temperature of 60–63° C. and at a pressure of 20 torrs. The vinyl thiirane product, collected as in Example III, weighed 3.5 gms. and, after drying over magnesium sulphate, had a refractive index $N_D^{20}$ of 1.5225.

The product gave the following major infrared absorbances (cm.$^{-1}$): 3085, 3070, 3005, 2995, 2915, 2890, 2845, 2470, 2080, 1830, 1632, 1435, 1425, 1398, 1310, 1280, 1248, 1192, 1152, 1110, 1040, 980, 954, 910, 809, 695, 660, 632, 565.

EXAMPLE IX

This example illustrates the preparation of allyl thiirane.

The procedure of Example III was followed for the reduction of 105 gms. of a 1,4-pentadiene/sulphur monochloride adduct using 260 gms. of sodium sulphide at a temperature of 80° C. and at a pressure of 5 torrs. The allyl thiirane product, collected as in Example III, weighed 33.2 gms. (43 percent yield) and, after drying over magnesium sulphate, had a refractive index $N_D^{20}$ of 1.4990.

The product gave the following major infra-red absorbances (cm.$^{-1}$): 3078, 2985, 2925, 2910, 2855, 2840, 2070, 1835, 1640, 1436, 1413, 1356, 1297, 1270, 1223, 1143, 1128, 1072, 1039, 990, 910, 773, 702, 658, 630, 610.

There was a shoulder in the spectrum at 630 cm.$^{-1}$.

The above procedure was repeated except that 75 gms. of the 1,4 - pentadiene/sulphur monochloride adduct were employed instead of 105 gms. The allyl thiirane product weighed 25 gms. (45 percent yield) and had a refractive index of 1.4976.

EXAMPLE X

This example illustrates the preparation of 2 - butenyl thiirane.

The procedure of Example III was followed for the reduction of 80 gms. of a 1,5 - hexadiene/sulphur monochloride adduct using 235 gms. of sodium sulphide at a temperature of 80–95° C. and at a pressure of 0.25 torr. The 2 - butenyl thiirane product, collected as in Example III, weighed 25 gms. and, after drying over magnesium sulphate, had a refractive index $N_D^{20}$ of 1.4947.

The product gave the following major infrared absorbances (cm.$^{-1}$): 3070, 2978, 2920, 2900, 2850, 2835, 2060, 1823, 1636, 1434, 1410, 1362, 1323, 1304, 1240, 1206, 1145, 1118, 1090, 1072, 1037, 988, 902, 871, 828, 818, 804, 770, 672, 630, 609, 590.

When the above procedure was repeated twice employing a pressure of 20 torrs. instead of 0.25 torr., 2 - butenyl thiirane in yields of 35 percent and 37 percent having refractive indices $N_D^{20}$ of 1.4920 and 1.4930, respectively, was obtained.

EXAMPLE XI

This example illustrates the preparation of 2 - hexenyl thiirane.

The procedure of Example III was followed for the reduction of 48 gms. of a 1,7 - octadiene/sulphur monochloride adduct using 80 gms. of sodium sulphide at a temperature of 100–120° C., and at a pressure of 10 torrs. The 2 - hexenyl thiirane product, collected as in Example III, weighed 11.0 gms. (29 percent yield) and, after drying over magnesium sulphate, had a refractive index $N_D^{20}$ of 1.4888.

The product gave the following major infrared absorbances (cm.$^{-1}$): 3075, 3060, 2980, 2940–2880, 2850, 2065, 1822, 1638, 1455, 1435, 1410, 1375, 1360, 1350, 1310, 1298, 1290, 1270, 1255, 1218, 1205, 1188, 1150, 1140, 1037, 990, 905, 870, 855, 800, 780, 734, 673, 635, 613, 597, 548.

EXAMPLE XII

This example illustrates the preparation of styrene episulphide.

40 gms. of a styrene/sulphur monochloride adduct were reduced by the procedure of Example III using 120 gms. of sodium sulphide at a temperature of 80° C. and at a pressure of 0.75 torr. The styrene episulphide product, collected as in Example III but using a 15 minute distillation period instead of 30 minutes, weighed 13.7 gms. (43 percent yield) and, after drying over magnesium sulphate, had a refractive index $N_D^{20}$ of 1.6025.

The infrared spectrum of the product was consistent with that expected for styrene episulphide.

EXAMPLE XIII

This example illustrates the reduction of a chloropolysulphide using potassium sulphide as the reducing agent.

15 gms. of bis(2 - chloropropyl)disulphide were slowly added to a mixture of 35 gms. of powdered sodium sulphite in a 1 litre 3-necked flask fitted with a mechanical stirrer and heated to a temperature of 80° C. During the addition, the temperature was raised to 110° C. and the pressure inside the flask was reduced to 30 torrs. When the addition was complete, 0.5 gm. of propylene sulphide was distilled over and collected in a Dry-Ice trap.

The product was shown by vapour-phase chromatography to have a purity of greater than 99 percent.

The residue in the flask was extracted with ether, dried over magnesium sulphate and concentrated to yield 4.75 gms. of unreacted bis(2 - chloropropyl)disulphide.

Having now described our invention, what we claim is:

1. A process for the preparation of monomeric vicinal episulphides comprising reducing a chloropolysulphide, being the reaction product of a hydrocarbon olefin with a sulphur chloride compound having a mol ratio of sulphur to chlorine of at least 0.5:1, using as the catalyst a sulphide of a metal of Group I of the A sub-group of the Menedeléeff Periodic Table in an amount such that the mol ratio of the metal sulphide:chloropolysulphide is from 1:1 to 6:1, said metal sulphide containing only said metal and sulphur and being in the dry powdered, flake or granular form.

2. A process according to claim 1 in which the chloropolysulphide is gradually added to the Group IA metal sulphide whilst the mixture is stirred.

3. A process according to claim 1 in which the chloropolysulphide contacts the Group IA metal sulphite in the absence of a solvent for the chloropolysulphide.

4. A process according to claim 1 in which the mole ratio of the Group IA metal sulphide to the chloropolysulphide is from 3:1 to 5:1.

5. A process according to claim 1 in which the amount of Group IA metal sulphide employed is in excess of the stoichiometrical amount required to reduce the chloropolysulphide present.

6. A process according to claim 1 in which the chloropolysulphide contacts the Group IA metal sulphide in the presence of a further sulphur-accepting compound.

7. A process according to claim 6 in which the further sulphur-accepting compound is in the powdered, flake or granular form.

8. A process according to claim 7 in which the further sulphur-accepting compound is sodium sulphite.

9. A process according to claim 7 in which the mole ratio of the further sulphur-accepting compound to the Group IA metal sulphide is from 1:1 to 6:1.

10. A process according to claim 9 in which the mole ratio of the further sulphur-accepting compound to the Group IA metal sulphide is from 3:1 to 5:1.

11. A process according to claim 1 in which the Group IA metal sulphide is sodium sulphide.

12. A process according to claim 11 in which the sodium sulphide contains some water of hydration.

13. A process according to claim 1 in which the sulphur chloride compound has a mole ratio of sulphur:chlorine of 1:1.

14. A process according to claim 1 in which the chloropolysulphide is a bis(beta-chloropropyl)polysulphide.

15. A process according to claim 1 in which the chloropolysulphide is a chlorodisulphide.

References Cited

UNITED STATES PATENTS 2,093,752  9/1937  Duecker et al. _____ 260—327

JAMES A. PATTEN, *Primary Examiner.*